United States Patent Office 3,397,268
Patented Aug. 13, 1968

3,397,268
PROCESS OF TREATING HERPES SIMPLEX WITH
1-β-D-ARABINOFURANOSYLCYTOSINE
James H. Hunter, Kalamazoo, Mich., assignor to The Upjohn Company, Kalamazoo, Mich., a corporation of Delaware
No Drawing. Continuation-in-part of application Ser. No. 217,543, Aug. 17, 1962. This application Sept. 1, 1965, Ser. No. 484,473
4 Claims. (Cl. 424—180)

This application is a continuation-in-part of application Ser. No. 217,543, filed Aug. 17, 1962, now abandoned.

This invention relates to a pharmaceutical composition and the use thereof and more particularly to a pharmaceutical nucleoside composition and to a process for its administration.

The inventive composition is a nucleoside composition comprising 1-β-D-arabinofuranosylcytosine and certain derivatives thereof dispersed in a pharmacetutically acceptable carrier. 1-β-D-arabinofuranosylcytosine and the derivatives can be prepared according to the methods disclosed in copending application Ser. No. 24,890, filed Apr. 27, 1960, now U.S. Patent No. 3,116,282. The derivatives include the acid-addition salts, for example, those of hydrochloric, citric, succinic, maleic, tartaric, and like acids. Of the acid-addition salts the hydrochloride is preferred. The inventive composition is unexpectedly active in cell culture against viruses, such as those of pseudorabies, fowl pox, swine pox, vaccinia, herpes simplex, and B-virus. The compositions can be advantageously employed in pharmaceutical applications, for example, in treating herpes simplex in affected mammal and bird subjects, for example, herpes simplex of the eyes.

The modes contemplated by the inventor of carrying out the invention include pharmaceutical compositions suited for topical use; and processes of administration thereof.

Solutions of the principal active ingredient can be prepared in water or in water suitably diluted with, for example, ethanol, glycerin, polyols (for example, glycerine, polyethylene glycols, propylene glycol), and the like. Dispersions can be prepared in gycerol, liquid polyethylene glycols, and mixtures thereof, and in oils. Under ordinary conditions of storage and use, these preparations contain a preservative to prevent the growth of microorganisms.

The basic solvent or dispersion medium can contain water, ethanol, polyols (for example, glycerol, propylene glycol, and liquid polyethylene glycol, and the like), suitable mixtures thereof, and vegetable oils. The proper fluidity can be maintained, for example, by the use of a coating such as lecithin, by the maintenance of the required particle size in the case of dispersions and by the use of surfactants (for example, a condensation product of ethylene oxide with fatty acids or fatty alcohols, partial esters of fatty acids and a hexitol anhydride, and polyoxyethylene condensation products of the esters). The prevention of the action of microorganisms can be brought about by various antibacterial and antifungal agents, for example, parabens, chlorobutanol, benzyl alcohol, phenol, sorbic acid, thimerosal, and the like. In many cases, it will be preferable to include isotonic agents, for example, sugars or sodium chloride.

Sterile solutions are prepared by incorporating the principal active ingredient in the required amount in the appropriate solvent with various of the other ingredients enumerated above, as required, followed by filter sterilization. Generally, dispersions are prepared by incorporating the previously sterilized active ingredient into a sterile vehicle which contains the basic dispersion medium and the required other ingredients from those enumerated above.

In the case of sterile powders for the preparation of sterile solutions the preferred method of preparation is the freeze-drying technique which yields a powder of the active ingredient plus any additional desired ingredients from a previously sterile-filtered solution thereof. The powders can also be sterilized by the use of a gas, for example, ethylene oxide and subsequently incorporated, with the required additional ingredients and in the proper particle size, into the basic powder for later reconstitution with the desired suspending liquid which, of course, itself must be sterile.

The compositions suited for topical use include, for example, lotions; ointments, especially ophthalmic ointments; and ophthalmic aqueous solutions, especially ophthalmic aqueous drops. To provide optimum contact by the ointments, an oleaginous ointment base is used, for example liquid petrolatum, petrolatum, and white petrolatum. Absorption bases, such as hydrophilic petrolatum, wool fat, and hydrous wool fat can be used also. The ophthalmic drops are sterile and may contain buffer salts providing a pH of about 7.4; and isotonic agents, for example, sodium chloride and dextrose. Bacteriostatic agents, for example, phenylethyl alcohol, benzalkonium chloride, chlorobutanol, and myristyl-gamma-picolinium chloride are incorporated in the drops.

An especially useful supplementary ingredient providing more than additive activity in the treatment of herpes simplex of the eyes is 5-iodo-2'-deoxyuridine, in the proportion of from about 0.5% to about 2.5% of the composition.

It is especially advantageous to formulate the inventive compositions in dosage unit form for ease of administration and uniformity of dosage. Dosage unit form as used in the specification and claims herein refers to physically discrete units suited as unitary dosages for the animal and human subjects to be treated, each unit containing a predetermined quantity of active material calculated to produce the desired therapeutic effect in association with the required pharmaceutical carrier. The specifications for the novel dosage unit forms of this invention are dictated by and directly dependent on (a) the unique characteristics of the active material and the particular therapeutic effect to be achieved and (b) the limitations inherent in the art of compounding such an active material for the treatment of disease in living subjects having a diseased condition in which bodily health is impaired as disclosed in detail in this specification, these being features of the present invention.

The dosage of the principal active ingredient for the treatment of the indicated condition depends on the age, weight and condition of the subject being treated; the particular condition and its severity; the particular form of the active ingredient and the route of administration. A dose of from about 0.1 to about 50 mgs./kg. or a daily total dose of from about 3 to about 4000 mgs. given singly or in divided doses of up to 5 times a day embraces the effective range for the treatment of most conditions for which the compound is effective. Expressed as amounts suited for single doses, from about 3 to about 1000 mgs. is operable.

The principal active ingredient is compounded for convenient and effective administration in effective amounts with a suitable pharmaceutically-acceptable carrier in dosage unit form as hereinbefore described. A unit dosage form can contain the principal active ingredient in amounts ranging from about 3 to about 1000 mgs. per unit. Expressed in proportions the active ingredient is present in from about 0.5 to about 25% w./v. of the liquid compositions.

The compositions suited for topical use contain from about 0.5% to about 2.5% by weight, preferably 1%.

In the case of compositions containing supplementary active ingredients, the dosage is determined by reference to the usual dose and manner of administration of the said ingredients.

The following examples set forth the manner and process of making and using the inventive compositions and include the best mode contemplated by the inventor of carrying out the invention.

EXAMPLE 5

Sterile solution

A sterile aqueous solution containing 250 mg. of 1-β-D-arabinofuranosylcytosine hydrochloride in each ml., is prepared from the following ingredients:

1-β-D-arabinofuranosylcytosine hydrochloride, 250 gms.
Water for injection, q.s., 1000 ml.

EXAMPLE 6

Sterile preparation

A sterile aqueous preparation containing 25 mg. of 1-β-D-arabinofuranosylcytosine in each 2 mls. is prepared from the following ingredients:

| | Gms. |
|---|---|
| 1-β-D-arabinofuranosylcytosine | 12.5 |
| Polyethylene glycol 4000, U.S.P. | 30 |
| Sodium chloride, U.S.P. | 9 |
| Preservative, q.s. | |
| Water for injection, q.s., 1000 ml. | |

EXAMPLE 10

Sterile powder for reconstitution

Sterile vials each containing 50 mgs. of 1-β-D-arabinofuranosylcytosine hydrochloride are prepared by first sterilizing 50 gms. of the principal active ingredient by treatment with ethylene oxide and thereafter filling 50 mgs. into each of 1000 sterile vials. At the time of use, the contents of a vial are reconstituted with q.s. water for injection to provide a sterile solution for administration.

EXAMPLE 11

Ophthalmic aqueous drops 1000 milliliters of drops is prepared as follows:

| | Gms. |
|---|---|
| 1-β-D-arabinofuranosylcytosine | 10 |
| Polyethylene glycol 4000 | 120 |
| Polyvinylpyrrolidone | 1 |
| Myristyl-gamma-picolinium chloride | 0.2 |
| Water for injection, q.s. ad., 1000 mls. | |

The ingredients are dissolved in the water. The resulting solution is sterilized by filtration and filled aseptically in sterile containers.

The application of one drop hourly to the eye is beneficial in the treatment of herpes simplex.

EXAMPLE 12

Ophthalmic ointment

One thousand grams of ophthalmic ointment is prepared as follows:

| | Gms. |
|---|---|
| Wool fat | 200 |
| Liquid petrolatum | 250 |
| 1-β-D-arabinofuranosylcytosine hydrochloride | 10 |
| White petrolatum | 540 |

The wool fat and white petrolatum are melted together and strained into a suitable container. The mixture is cooled to about 110° F. The active ingredient is well mixed into the liquid petrolatum and the whole is milled. The two parts are well mixed, and the whole is stirred at high speed until congealed. The final product is filled into suitable individual containers.

Application to the affected eyes is highly beneficial in the treatment of herpes simplex keratitis in rabbits.

EXAMPLE 13

Ophthalmic ointment

An ointment is prepared in accordance with Example 12, except that the amount of 1-β-D-arabinofuranosylcytosine hydrochloride is reduced to 5 gms., and 5 gms. of 5-iodo-2'-deoxyuridine is incorporated. Such ointment is more active in the treatment of herpes simplex keratitis in rabbits' eyes than are like ointments containing 1% of 1-β-D-arabinofuranosylcytosine hydrochloride or 1% of 5-iodo-2'-deoxyuridine.

EXAMPLE 14

Lotion 1000 milliliters of a lotion is prepared as follows:

| | Gms. |
|---|---|
| 1-β-D-arabinofuranosylcytosine | 25 |
| Preservative | 1 |
| Glyceryl monostearate, self-emulsifying (Tegacid regular) | 25 |
| Spermaceti | 1 |
| Purified water, U.S.P., q.s. ad. 1000 mls. | |

About 700 mls. of the water is heated to about 160° F. and the preservative is dissolved therein. The glyceryl monostearate and spermaceti are added in order, while mixing homogeneously at about 160° F. After cooling of the mixture, the active ingredient is added thereto, and the whole is made up to volume with the water.

The lotion is used for the treatment of herpes simplex in living subjects affected bodily.

EXAMPLE 15

Sterile preparation 24,000 ml. of sterile solution are prepared as follows:

| Each ml. | Total, gms. |
|---|---|
| 57.5 mg. cytarabine hydrochloride | 1380 |
| 5 mg. sodium citrate | 120 |
| 9.45 mg. benzyl alcohol | 227 |
| 2.3 mg. sodium bisulfite | 55.2 |
| Sodium hydroxide (50% aqueous solution), q.s. | |
| Water for injection, q.s. ad. 24000 ml. | |

*Directions.*—Dissolve the principal active ingredient, sodium citrate and benzyl alcohol in 2,000 ml. water. Add the sodium bisulfite and adjust to pH 7.0 with the alkali. Make up to volume. Sterile filter the whole. Fill into 10 ml. sterile vials.

What is claimed is:

1. A process of treating herpes simplex in affected humans and animals which comprises the topical administration to said subjects of a topical pharmaceutical preparation comprising as principal active ingredient from about 0.5 to about 2.5% by weight of a member selected from the group consisting of 1-β-D-arabinofuranosylcytosine and a non-toxic acid addition salt thereof and as supplementary active ingredient from about 0.5 to about 2.5% by weight of 5-iodo-2'-deoxyuridine.

2. A process of treating herpes simplex in affected humans and animals which comprises the topical administration to said subjects of an effective amount of a member selected from the group consisting of 1-β-D-arabinofuranosylcytosine and a non-toxic acid addition salt thereof dispersed in a topical pharmaceutical carrier.

3. A process of treating herpes simplex in affected humans and animals which comprises the topical administration to said subjects of a pharmaceutical preparation comprising from about 0.5 to about 2.5% by weight of a member selected from the group consisting of 1-β-D-arabinofuranosylcytosine and a non-toxic acid addition salt thereof dispersed in a topical pharmaceutical carrier.

4. The process of claim 3 in which the pharmaceutical preparation comprises from about 0.5 to about 2.5% by weight of a member selected from the group consisting of 1-β-D-arabinofuranosylcytosine and a non-toxic acid addition salt thereof, buffer salts providing a pH of about 7.4, an isotonic agent, and a liquid topical pharmaceutical carrier.

References Cited

UNITED STATES PATENTS 3,116,282  12/1963  Hunter _____ 260—211.5

ALBERT T. MEYERS, *Primary Examiner.*

J. GOLDBERG, *Assistant Examiner.*